June 30, 1953  C. H. WATSON  2,644,067
PORTABLE ELECTRIC SPOT WELDING APPARATUS
Filed Dec. 3, 1949  3 Sheets-Sheet 2

INVENTOR
COLEMAN H. WATSON
BY Jennings & Carter
ATTORNEYS

June 30, 1953     C. H. WATSON     2,644,067

PORTABLE ELECTRIC SPOT WELDING APPARATUS

Filed Dec. 3, 1949     3 Sheets-Sheet 3

INVENTOR
COLEMAN H. WATSON

BY Jennings & Carter

ATTORNEYS

Patented June 30, 1953

2,644,067

UNITED STATES PATENT OFFICE 2,644,067

PORTABLE ELECTRIC SPOT WELDING APPARATUS

Coleman H. Watson, Birmingham, Ala., assignor of sixty per cent to Aaron Sachs, Bessemer, Ala.

Application December 3, 1949, Serial No. 130,925

7 Claims. (Cl. 219—4)

My present invention relates to electric welding apparatus, and more particularly to electric resistance spot welders.

The primary object of my invention is the provision of an entirely portable electric spot welder in which the welding head or "gun" is light in weight, compact and efficient, and which shall be capable of welding pieces of material together by applying the electrodes of the gun to a common side of one of the pieces to be welded.

Another object is to provide apparatus of the characted designated which shall be capable of spot welding a sheet of material to another body of metallic material of infinite thickness, or which, with equal facility may be used to weld together a pair of thin sheets by the use of a suitable backing bar of conducting material.

Another major object of my invention is to provide a spot welder operable from a source of alternating current and in which the welding current transformer is carried in the welding head or gun, whereby the large inductive losses of voltage in the welding circuit which are present in prior art apparatus is reduced substantially to zero, one reason for this reduction in losses being the fact that I am enabled to reduce considerably the distance between the transformer secondary connection, namely the electrode circuit, and the work.

A further object is to provide a self contained welding transformer, housing and electrode holder for making spot welds in which the transformer is provided with a hollow cylindrical core formed of a continuous sheet of a high permeability silicon iron having superior magnetic qualities existing therein only in the direction in which the sheet was rolled in the manufacture thereof, together with a multiple turn secondary which supplies the electrodes with current, thus providing a portable spot welder which is light in weight, in which the overall size of the gun is reduced to a minimum and which may be manufactured at a fraction of the cost of the present opposed electrode, non-portable type of apparatus of generally similar welding capacity.

A further object is to provide a welding transformer in which the secondary thereof comprises a relatively heavy, divided and twisted bar or rod of conducting material, the ends of each section thereof being alternately electrically connected to the divided housing, whereby the current in said secondary flows in series therethrough to the welding electrodes, thus raising the voltage of the welding current and increasing the efficiency and welding capacity of the apparatus over the capacity and efficiency of the same if a single turn secondary was employed, and without increasing the weight or size thereof to any material extent.

Another object is to provide an entirely portable spot welder in which the energizing switch for welding transformer control circuits is carried on the gun or head and closeable by downward movement of a suitably spring biased handle, together with a timing circuit for controlling the duration of flow of welding current, whereby the necessary mechanical pressure of the electrodes against the work is obtained and the weld made by the operator pressing downwardly on the handle, thus reducing the actual making of the weld to the simple manual operation of placing the electrodes at the desired place on the work and pressing down on the operating handle, assuring the making of good welds by even unskilled operators.

Further and more general objects are to provide a fully portable spot welder which shall produce high quality welds, which shall be low in initial cost, economical, safe and trouble free in operation; in which the entire apparatus including a substantially constructed carrying case therefor shall weigh in the neighborhood of 50 pounds including about 20 feet of cable; and in which such apparatus has the capacity of making welds between metallic sheets, the sheet contacted by the electrodes being up to 16 gauge, and in which the other of which may be of infinite thickness.

Apparatus illustrating the features of my invention is shown in the accompanying drawings forming a part of this application in which:

Fig. 5 is an enlarged side elevational view partly broken away and in section to show the internal construction of the gun;

Figure 12:
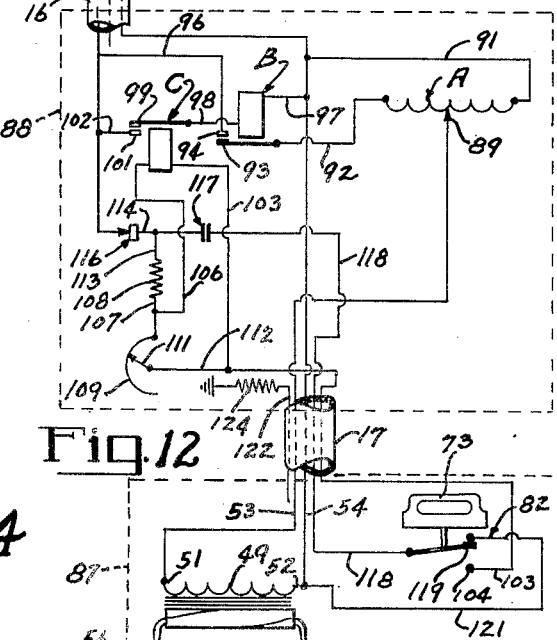
Figure 7:
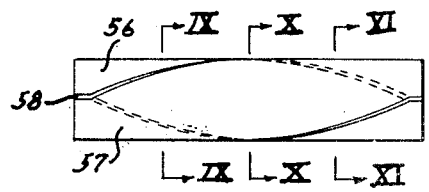
Fig. 7 is a view of the divided and twisted secondary of the transformer removed from the remainder of the apparatus.
Figures 8, 9, 10, 11:
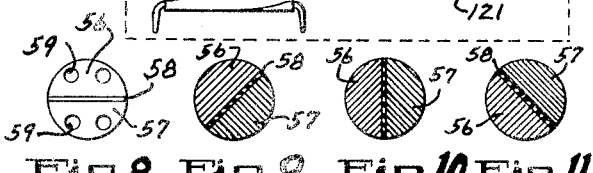
Fig. 8 is an end view of the secondary.
Figure 13:
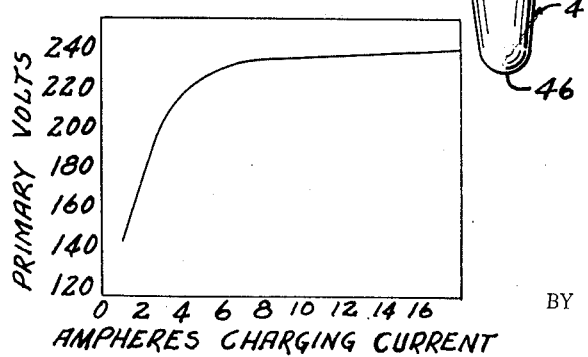

Figs. 9 to 11 inclusive are detail sectional views taken on the respective lines indicated on Fig. 7;

Fig. 12 is a somewhat diagrammatic wiring diagram showing the complete circuit for the welding gun and control circuit therefor; and, Fig. 13 is a graph illustrating the charging volt-voltage-amperage relation of the welding transformer to be described more in detail herein.

Figure 1:
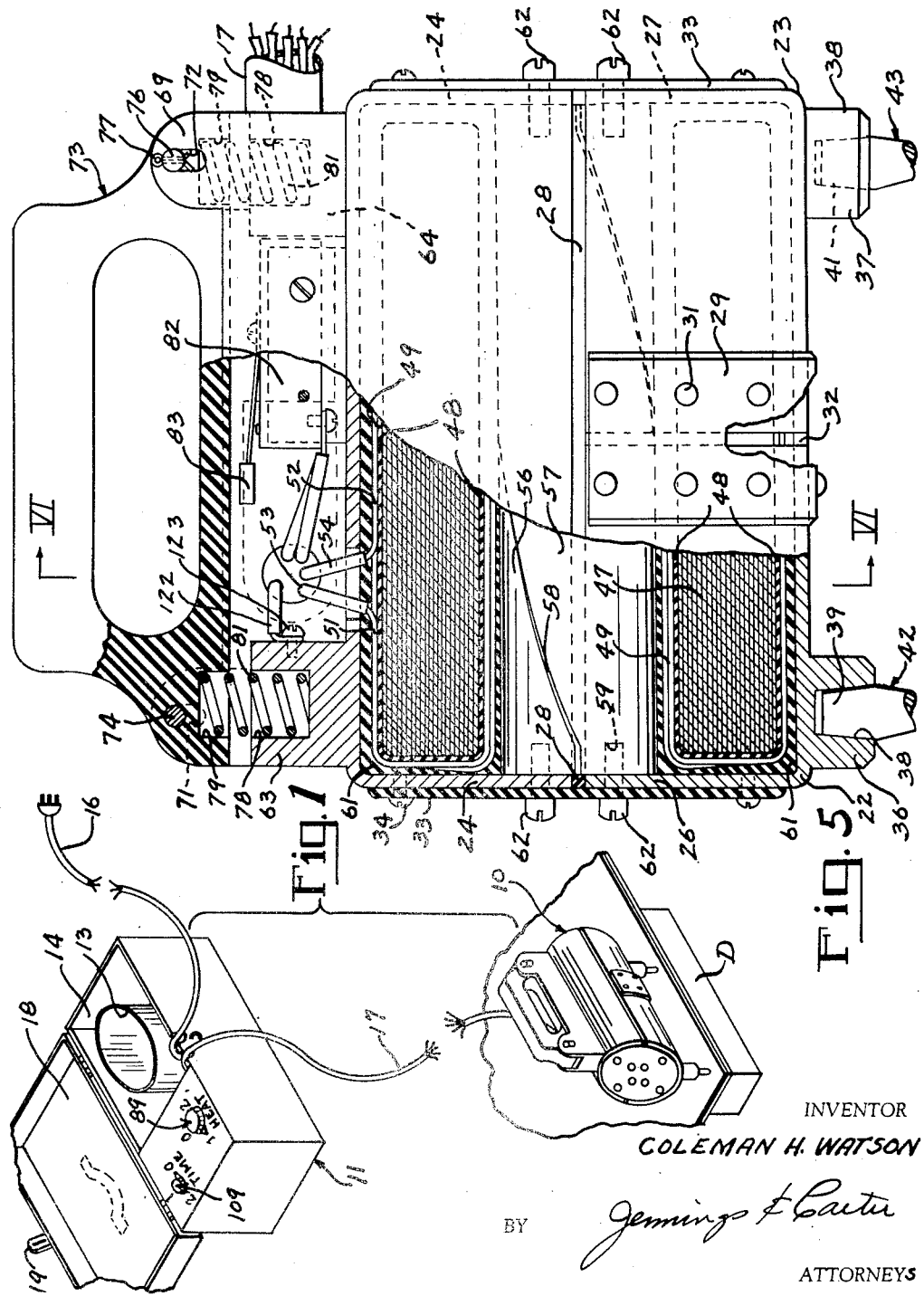
Fig. 1 is a somewhat diagrammatic perspective view, partly broken away showing my complete apparatus with the gun removed from the carrying case and in place on a pair of metallic members to be welded.
Figure 2:
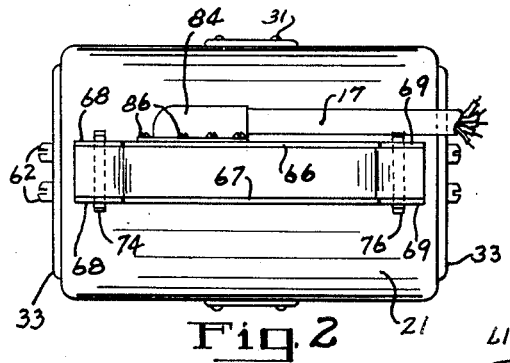
Fig. 2 is a plan view of the welding gun.
Figure 3:
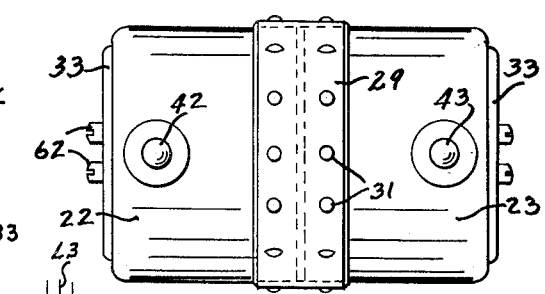
Fig. 3 is a bottom view thereof.
Figure 4:
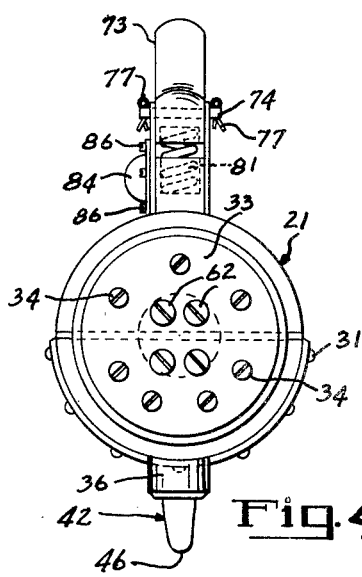
Fig. 4 is an end elevational view of the gun.

Referring now to the drawings for a better understanding of my invention, and more particularly to Fig. 1, my improved apparatus comprises generally two units. First, the same comprises the welding head or gun 10 constructed and arranged as will be hereinafter more definitely set forth. Second, there is provided a suitable carrying case 11. The case 11 has a storage compartment 13 therein for receiving the gun proper, and immediately surrounding compartment 13 is a space 14 for receiving the pair of cables. In the opposite end of the carrying case there is ample space for housing the control and timing mechanism and portions of the circuits therefor. Electricity is supplied to the unit through the input cable 16, and is supplied to the gun through the cable 17. The carrying case 11 may be provided with a suitable hinged cover 18 and a lock in the form of a hasp 19.

As shown more particularly in Figs. 2 to 6 inclusive the welding gun 10 comprises a generally cylindrical body portion. The body is preferably formed of an upper substantially semi-cylindrical section 21 and lower end sections 22 and 23, also substantially semi-cylindrical. Each of the sections 21, 22 and 23 is provided at each end with heads 24, 26 and 27, respectively. The heads preferably are cast integrally with the remaining portions of the several sections. As shown more clearly in the detailed drawing, the adjacent edges of the upper and lower sections, both of the longitudinal portions and the heads are spaced apart and preferably have strips 28 and 28a of insulating material interposed therebetween. The lower sections 22 and 23 are held spaced apart and insulated from each other by means of a band 29 of insulating material. The band may be secured to the sections 22 and 23 by means of flat head rivets 31 or the like. Likewise, the adjacent inner edges of the sections 22 and 23 are insulated, preferably by a strip 32 of insulating material. The sections 21, 22 and 23 are held assembled by means of discs 33 of insulating material and screws 34 passing through the discs and into the heads 24, 26 and 27.

On the underside of each of the end sections 22 and 23, and preferably formed integrally therewith are bosses 36 and 37. The bosses are provided with tapering openings 38 in which are disposed to be pressed the tapering upper ends 39 and 41 of a pair of electrodes 42 and 43. The electrodes may be cast members, and as is usual for such devices the lower or shank portion thereof tapers downwardly and terminates in a spherical point 46.

From the description so far given it will be seen that with the upper and lower sections of the gun body assembled there is provided a space on the inside thereof. In this space I place the improved form of welding transformer now to be described.

The transformer core 47 preferably comprises a continuous sheet of a high permeability silicon iron which, in the process of its manufacture, has been so rolled and heat treated and otherwise handled that the individual crystals thereof line up with cube edges essentially parallel to each other and to the direction of rolling. A suitable material of this kind is sold by the Westinghouse Electric Corporation, Sharon, Pennsylvania, under the trade name "Hipersil," and the specific type of the same which I prefer to use is designated in booklet "B 3701," issued by that company in July 1946, and designated under the grade designation of "C 97 (29 Guage)." The core 47 thus comprises a sheet of such material which has been rolled during manufacture longitudinally of its length and is then wound in spiral form to the shape of a cylinder. After rolling the sheet to spiral form thereby to form the core 47, I insulate the exterior, ends and interior thereof with a suitable material such as a resin impregnated cotton fabric 48.

The primary of the transformer comprises a continuous length of insulated wire 49 passed through the central opening of the core, around the ends and on the outside thereof. I preferably so design the entire apparatus that the wire of the required size, when laid on the core, provides a single layer on the exterior surface of the core and a double layer in the bore or centrally disposed opening thereof. The ends 51 and 52 of the primary winding are connected to a pair of wires 53 and 54 in the cable 17. These wires are connected to the source of current through the control and timing mechanisms and circuits in the manner later to be described.

Figure 6:
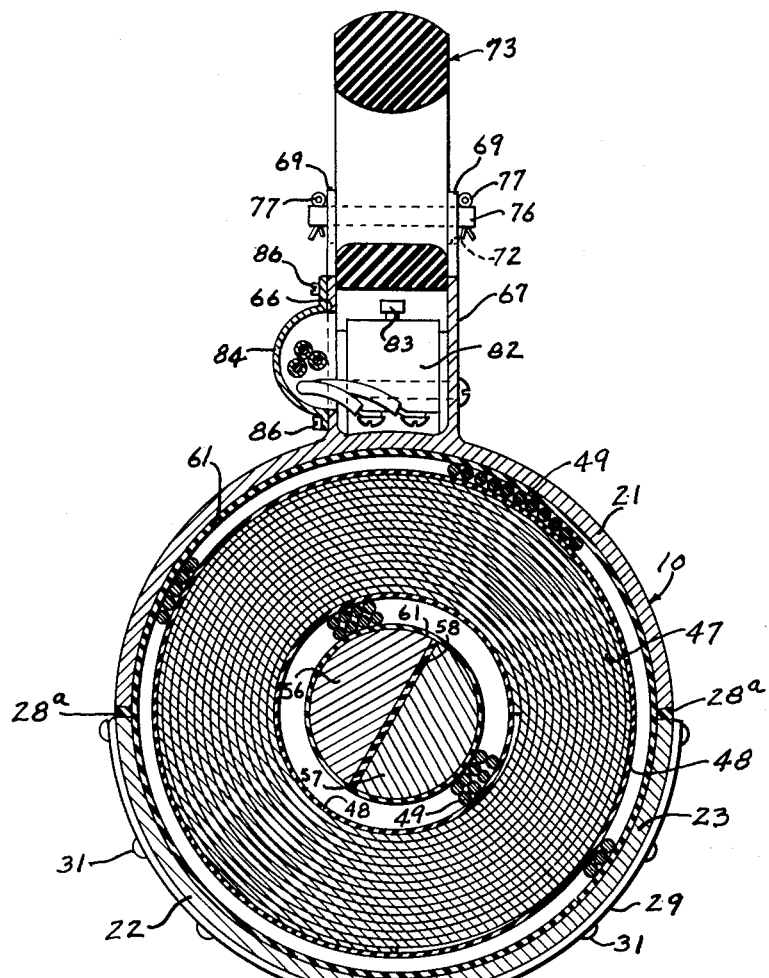
Fig. 6 is a detail sectional view taken generally along line VI—VI of Fig. 5.

The secondary of the transformer preferably comprises a pair of elongated copper, aluminum, or aluminum alloy members 56 and 57, semi-circular in transverse section and insulated from each other by a strip of insulating material 58. In forming the secondary of the transformer I find it convenient to use a rod of material of high electrical conductivity such as copper of a diameter to fit into the bore of the core after the primary winding is laid thereon, and using a blade of about the thickness of a hand hack saw blade to saw the rod down the middle from end to end. I now lay the strip of insulating material 58 between the halves so formed and place the halves together. Holding one end of the sawed rod in a vise, I engage the other end with a suitable clamping tool and twist the rod bodily 180°. As seen in Figs. 5 and 7 to 11, inclusive, this results in a two turn secondary, and the slots or lines of division between the halves thereof are horizontally disposed at each end of the secondary. In the ends of the sections 56 and 57 I drill and tap holes 59. I now assemble the transformer into the housing, further insulating the primary winding 49 from the housing by means of suitable insulating material 61 as indicated in Figs. 5 and 6. The secondary is held in place, and the ends thereof are electrically connected to the heads 24, 26 and 27 by means of screws 62 passing through the discs of insulating material, the heads, and thence into the tapped holes 59.

Considering Fig. 5 it will be seen that one end of the half 56 of the secondary is electrically connected to one end wall 24 of the upper housing section 21. The other end of the half 56, due to the fact that the secondary is twisted, is electrically connected by the screws 62 to the end wall 27 of the lower housing half 23. In like manner, the end of the half 57 adjacent the end of the half 56 connected to the upper housing, is connected by the screws 62 to the end wall 26 of the lower housing section 22. Due to the twisting of the secondary, the opposite end of the half 57 is connected by the screws 62 to the opposite head 24 of the upper housing section 21. Thus, the direct and inductive electrical circuits between the electrodes may be traced as follows: Commencing at electrode 42 the path of current is through the end wall 26 of the lower housing section 22, to one end of the secondary half 57, and thence to the opposite end wall 24 of the upper housing section 21. Electrode 43 is similarly connected to the associated end of the secondary half 56 by the associated screws 62 through the end wall 27, while the opposite end of the half 57 is in turn connected to the opposite end wall 24 of the upper housing section 21. The voltage of the current induced in the respective halves of the secondary thus is additive, since there are two turns in the secondary and the total voltage available for welding is equal to twice the voltage in each of the turns of the secondary. Since the lines of force cut by the two halves are substantially identical in number, the voltage in each turn of the secondary is the same for all practical purposes.

The energizing, timing and control apparatus and circuits which I prefer to employ with the apparatus so far described will now be set forth in detail. As shown more clearly in Figs. 2 and 5 I form on top of the upper section 21 a pair of longitudinally spaced bosses 63 and 64. The bosses are connected along their sides by integrally formed ribs 66 and 67. Upstanding from the bosses 63 and 64 are pairs of spaced ears 68 and 69. In the pairs of ears 68 and 69 are aligned, vertically elongated openings 71 and 72.

Disposed to slide vertically between the ears and toward and from the bosses 63 and 64 is an operating handle 73 preferably formed of non-conducting material. Passing through the ends of the handle and the pairs of ears are pins 74 and 76. The pins are of a size to fit slidably in the elongated openings, and may be retained in place by means of cotter pins 77 passing therethrough.

The bosses 63 and 64 and the adjacent ends of the underside of the handle 73 are provided with recesses 78 and 79, respectively. Fitting within the recesses are compression springs 81. The springs 81 are designed to require a considerable downward force on the handle 73 prior to permitting relative downward movement of the handle, for a purpose later to be described.

Mounted between the ribs 66 and 67, beneath the central portion of the handle 73 is a single pole double throw switch 82. The switch has an operating handle 83 disposed in position to be closed to its other or normally open position upon downward movement of the handle. The cable 17 is secured to the welding head 10 by means of a plate 84 held to the side of the rib 66 by means of screws 86.

Referring now to Fig. 12 of the drawing, I show diagrammatically a wiring diagram for the complete apparatus. In Fig. 12, the dotted line 87 encloses those portions of the apparatus which are in the gun 10 proper, while the dotted line 88 encloses those portions which are in the carrying case 11. As shown, the cable 17 contains 5 individually insulated wires. Of these wires, wire 54, leading from the end 52 of the welding transformer primary 49, leads to the case 11 and thence connects directly as shown in Fig. 12 to the power supply line L2. The wire 53 connected to the welding transformer primary 49 at 51 leads to the slidewire connection 89 of a variable voltage auto transformer A. One terminal of the auto transformer winding connects through a wire 91 to the line L2. The other terminal of the auto transformer winding is connected by a wire 92 to the movable contact 93 of a line relay or contactor, indicated generally by the letter B. The fixed contact point 94 of the relay B is connected to the line L1 through a wire 96. One lead of the coil of the relay B connects through a wire 97 to the supply line L2, and the other lead thereof is connected through a wire 98 to the movable contact 99 of a second relay C. The fixed contact point 101 of the relay C is connected by a wire 102 to the line L1.

One terminal of the coil of the relay C is connected by a wire 103 to the normally open contact point 104 of the switch 82. The opposite terminal of the coil of the relay C is connected by a wire 106 to a wire 107 in turn connected at each end to one end of a fixed resistance 108 and to one end of the resistance element of a rheostat 109. The slide wire 111 of the rheostat 109 is connected by a wire 112 to the wire 103. The end of the fixed resistance 108 opposite the wire 106 is connected by a wire 113 to a wire 114 connected at one end to the plate of a rectifier 116 and at its other end to one plate of a condenser 117. The opposite plate of the condenser is connected by a wire 118 which leads to the blade of the switch 82. The normally closed contact point 119 of the switch 82 is connected to the end 52 of the welding transformer primary 49 by means of a wire 121.

As is usual, the third wire L3 in the cable 16 is a ground wire and is connected in any suitable manner to the carrying case 11 for safety purposes. The fifth wire 122 in the cable 17 is connected by a screw 123 to the upper housing section 21 and is then grounded to the case 11 through a choke coil 124, also carried in the case.

From the foregoing the method of constructing my improved spot welder, the method of its operation and the advantages thereof may now be readily explained and understood. From the arrangement of the divided housing and its relation with respect to the twisted secondary it will be apparent that the housing itself forms a part of the electrical circuit for the welding operation, the lower end sections being the terminals of the secondary circuits. The secondary of the welding transformer is a part of the welding head and the area enclosed within the welding loop is reduced to a minimum. For this reason the electromotive force in the secondary terminals of the transformer need not be more than a total of 3 volts, namely, a total of one and one-half volt for each turn of the secondary. I thus not only eliminate the large inductive losses in the prior art apparatus wherein it is attempted to carry the high current from the secondary of a transformer to the electrodes, but also reduce to the minimum the tendency of the electrodes to burn holes in thin metal. As has been before stated, the compactness of the construction makes the entire welding gun extremely light in weight. With the cable 16 connected to a suitable source of voltage, for instance a source of 220 volt, 60 cycle alternating current it will be apparent that the switch 82 is closed to the position to connect the movable blade thereof to the contact point 119, it being remembered that the operating handle 73 is upwardly biased by means of the springs 81. Under these conditions the condenser 117 is charged with a given quantity of current depending upon its capacity, since the current therefor is derived from the lines L1 and L2 through the rectifier 116. As the operating handle 73 is moved downwardly the movable blade of the switch closes against contact 104, energizing the coil of the relay C. This closes the contact points 99 and 101 of the relay C, in turn energizing the coil of the relay B, causing the contact points 93 and 94 thereof to close. From an inspection of the wiring diagram it will be apparent that this energizes the primary winding 49 of the welding transformer with energy from the auto transformer A. As soon as the charge on the condenser has dissipated itself the circuit to the coil of relay C is broken, and this breaks the circuit to the coil of relay B, thus deenergizing the primary winding 49. The quantity of the charge of the condenser 117 is determined by the line voltage. However, due to the effect of the resistances 108 and 109 the time of energization of the winding 49 is modified as determined by the setting of the rheostat 109. The voltage impressed upon the winding 49 is determined by the setting of the slide wire 89 of the auto transformer. These controls are indicated respectively in Fig. 1 of the drawing by the corresponding numerals 109 and 89 and also by the dials and scales marked time and heat, respectively. It will be noted that once the transformer primary 49 is energized, the same remains energized until the condenser discharges. Thus, regardless of the position of the handle 73, the energization time depends entirely upon the time that it takes the condenser 117 to discharge its current. Therefore, by suitably adjusting the rheostat 109 I am enabled to time the welding cycle from a very few alternations of the current to as high as ¼ of a second or longer if desirable. In actual practice, I have found that a fixed resistance of 250 ohms and a variable resistance of 1000 ohms when using a 100 mfd. condenser 117, is ample to provide the time range necessary for the usual welding purposes. Likewise, the rectifier 116 may be of the simple, dry disc type, no vacuum tubes or the like being required. In practice I prefer to employ a selenium disc type rectifier.

In making the weld with my improved apparatus the operator merely places the electrodes 42 and 43 at the place desired, and having set the auto transformer for the voltage required and the rheostat 109 for the time required, presses downwardly on the handle 73. It will be seen that due to the pre-loading of the springs 81 there is provided at the point of contact of the electrodes with the top sheet to be welded a pressure which is equal both to the weight of the welding gun itself and to the increase required to compress the springs 81.

Referring to Fig. 13 of the drawing I show a graph of the primary voltage of the transformer winding 49 plotted against the charging current produced thereby. It will be seen that the knee of the curve is considerably higher than would be the case if the core 47 were made of ordinary laminated iron. The voltage in the secondary at 240 volts in the primary was found to be approximately 1.670 volts per turn. This chart was made from a welder in which the total weight of the welding gun was 22.2 pounds. The dimensions of the core, which was made from "C 97 (29 gauge) Hipersil," were 5.625 inches long, 3.625 inches in major diameter, and with a central opening of 1.875 inches in diameter. The secondary was formed of a copper rod 1.25 inches in diameter and 6.25 inches long, and the primary winding consisted of 145 turns of No. 15 single cotton, enameled, magnet copper wire. With a welding apparatus thus constructed I have successfully welded sheets of steel of from a few thousandths inch thick up to .0626 inch thick, and have welded such sheets onto other sheets of varying thicknesses. In this connection I desire to point out also that my improved apparatus is capable of making welds between sheets in which the lowermost one or the underside of the uppermost one is rusty, or otherwise scaled or oxidized. For instance, the ordinary mill scale on the lower surface of the upper sheet or on the upper surface of the lower sheet apparently does not affect either the welding time or the quality of the final weld produced. When welding thin sheets to each other, I place a low resistance bar D (Fig. 1) of copper or the like behind the lower sheet to act as a conductor to help carry the current. This is necessary if the sheets being welded are so thin as to create an excessive voltage drop, as will be apparent to those skilled in the art.

While I have shown the secondary as being a two turn secondary, it will be apparent that by dividing a rod of copper or the like into three segments and twisting the same only 120°, and in then providing a housing divided into four parts, one could as easily produce a three turn secondary. Or, other numbers of turns or a single secondary could be provided if desirable, it being noted that the number of housing sections is equal to the number of turns in the secondary plus one. However, I have found as a matter of actual practice and experience that the two turn secondary apparently is the best for the general type of welding for which spot welders are suited.

From the foregoing it will be apparent that I have devised an improved spot welding apparatus. My invention has particular utility in connection with welding iron roofing or siding to steel frame buildings and the like, in the making of woven wire fence and the like, for general sheet welding purposes in and around fabricating shops, and in any other installation in which an efficient, portable, low cost spot welder is desired. It will also be seen that the current in the primary winding of my improved apparatus is not excessive, and that the same may be used by plugging into the usual outlet provided in shops and the like. I preferably design the apparatus for use on 220 volt circuits, but it will be apparent to those skilled in the art that the device could be made to operate on 110 volts, 440 volts, or any other voltage by properly calculating the requirements of the transformer in accordance with known formulae. Further, in the event it is desired to produce only one weld at a time instead of one under each of the electrodes 42 and 43 I can accomplish this by replacing one of the electrodes with a relatively wide surfaced electrode in which event welding takes place only at the smaller or pointed electrode. Further, for the purpose of welding round rods or other odd shapes, special tips can be provided, and off set tips likewise can be used for special applications. I have been able to reduce the weight of my improved welding head or gun from the 22.2 pounds mentioned above for the one made of copper to 16 pounds and 10 ounces for a gun of equal capacity made of aluminum or certain aluminum alloys.

While I have shown my invention in but one form, it will be obvious to those skilled in the art that it is not so limited, but is susceptible of various changes and modifications, without departing from the spirit thereof, and I desire, therefore, that only such limitations shall be placed there-

What I claim is:

1. In an electric resistance spot welder, a welding gun embodying a shell type housing divided into three sections one of which extends from end to end of the housing and the other two of which extend partially from end to end thereof, said sections being electrically insulated from each other, a welding transformer in said housing embodying a hollow core and a primary winding on said core, a two conductor secondary winding for said transformer located in said core each of which has one end electrically connected to the continuously extending housing section and the opposite end thereof connected to one of the other housing sections, electrodes electrically connected to said other housing sections, and means to supply the primary with alternating current.

2. A welder as defined in claim 1 in which the secondary winding comprises a pair of conducting members substantially semi-circular in transverse section and insulated from each other, said sections being twisted 180° throughout the length thereof.

3. In a welding gun, a housing having therein a welding transformer embodying a cylindrical core with a primary winding thereon, a plurality of conductors located within the cylindrical core and forming a secondary winding for the transformer, said housing being divided into a pair of terminal sections and an intermediate section, the sum of said sections being equal in number to the number of conductors in the secondary plus one and said sections being electrically insulated from each other, the conductors of said secondary winding being electrically connected in series to said housing sections whereby current produced in the secondary flows in series through the conductors of the secondary winding and through the intermediate housing section and the terminal sections, electrodes electrically connected to the terminal housing sections, and means including a source of E. M. F. to energize the primary winding.

4. A welding transformer having a core formed of a rectangular sheet of silicon iron wound into cylindrical shape with a centrally disposed opening therethrough, said sheet of material having individual crystals of the iron lined up with cube edges essentially parallel to each other and parallel to the direction of the length of the sheet, a primary winding comprising a plurality of turns of wire laid on the outer surface of the core, across the ends and through the opening thereof, a two turn secondary winding for the transformer comprising two solid substantially semi-cylindrical conductors of substantially equal cross sectional area assembled to form a generally cylindrical two conductor secondary portion located in the core, said conductors being twisted throughout their length substantially 180°, the diameter of said assembled two conductor secondary portion being slightly less than the diameter of the central opening of the core with said primary winding in place therein, means electrically insulating the semi-cylindrical conductors of the secondary winding from each other, and means electrically connecting together an opposite end of each of said semi-cylindrical conductors thereby completing said two-turn secondary winding.

5. Apparatus as defined in claim 1 in which each of said housing sections embodies an end wall substantially semi-circular as viewed in end elevation and in which said secondary comprises a pair of members substantially semi-circular as viewed in end elevation and of a length to extend from end wall to end wall of the housing.

6. In an electric welder, a metallic housing comprising an upper semi-cylindrical section, generally semi-circular end walls formed integrally with the upper section, a lower housing section comprising two semi-cylindrical sections each equal in length to approximately one half the length of the upper section, a generally semi-circular end wall formed integrally with and at one end of each lower section, means holding said housing sections assembled and electrically insulated from each other to define a centrally open cylindrical shell with the end walls of each lower housing section lying substantially in the same plane with the adjacent end walls of the upper housing section, a transformer in said shell comprising a primary winding and a core having a longitudinally disposed cylindrical opening therethrough, a secondary winding for the transformer in the form of a solid rod of electrical conducting material divided longitudinally into a pair of semi-cylindrical sections equal in length to substantially the distance between the inner surfaces of the end walls of the assembled housing sections, said sections of the secondary being twisted 180° throughout the length thereof, means electrically connecting the oppositely disposed ends of each of said sections of the secondary to the end walls of the upper housing section and the other ends thereof to the adjacent end walls of the lower housing sections, a pair of welding electrodes carried by the lower housing sections, and means including a source of E. M. F. to energize the primary winding whereby current induced in the secondary winding flows in series therethrough and through said housing sections.

7. In a welding gun, a shell-like housing assembly comprising an upper generally semi-cylindrical elongated section, a lower generally semi-cylindrical section divided transversely of the length thereof into two sections, means holding all of the housing sections assembled and out of electrical contact with each other, a transformer comprising a cylindrical core in the housing with the longitudinal axis of the opening therethrough substantially coincident with the longitudinal axis of the housing, a primary winding wrapped about and through said core, a two conductor secondary in the opening of said core in the form of an elongated metallic rod fitting snugly in the core opening and divided along the longitudinal axis thereof into a pair of elongated semi-cylindrical sections, insulating material between the conductors of said secondary, means electrically connecting the oppositely disposed ends of each of said secondary conductors to the adjacent end of the upper housing section, means electrically connecting the other oppositely disposed ends of said secondary conductors to the adjacent sections of the lower housing, electrodes electrically connected to the lower housing sections, and means to energize the primary winding.

COLEMAN H. WATSON.

References Cited in the file of this patent

UNITED STATES PATENTS

| Number | Name | Date |
|---|---|---|
| 1,086,041 | Gravell | Feb. 3, 1914 |
| 1,247,741 | Taylor | Nov. 27, 1917 |
| 1,779,365 | Von Henke | Oct. 21, 1930 |

(Other references on following page)

UNITED STATES PATENTS

| Number | Name | Date |
|---|---|---|
| 1,867,225 | Le Van et al. | July 12, 1932 |
| 1,892,017 | Stausbury et al. | Dec. 27, 1932 |
| 1,993,961 | Groven | Mar. 12, 1935 |
| 2,063,257 | Martin | Dec. 8, 1936 |
| 2,063,258 | Martin | Dec. 8, 1936 |
| 2,152,631 | Bohn | Apr. 4, 1939 |
| 2,179,326 | Eckman | Nov. 7, 1939 |
| 2,232,222 | Flinn | Feb. 18, 1941 |
| 2,269,726 | Martin | Jan. 13, 1942 |
| 2,300,172 | Platz | Oct. 27, 1942 |
| 2,342,594 | Mesch et al. | Feb. 22, 1944 |
| 2,436,636 | D'Entremont | Feb. 24, 1948 |

FOREIGN PATENTS

| Number | Country | Date |
|---|---|---|
| 886,170 | France | June 28, 1943 |